UNITED STATES PATENT OFFICE.

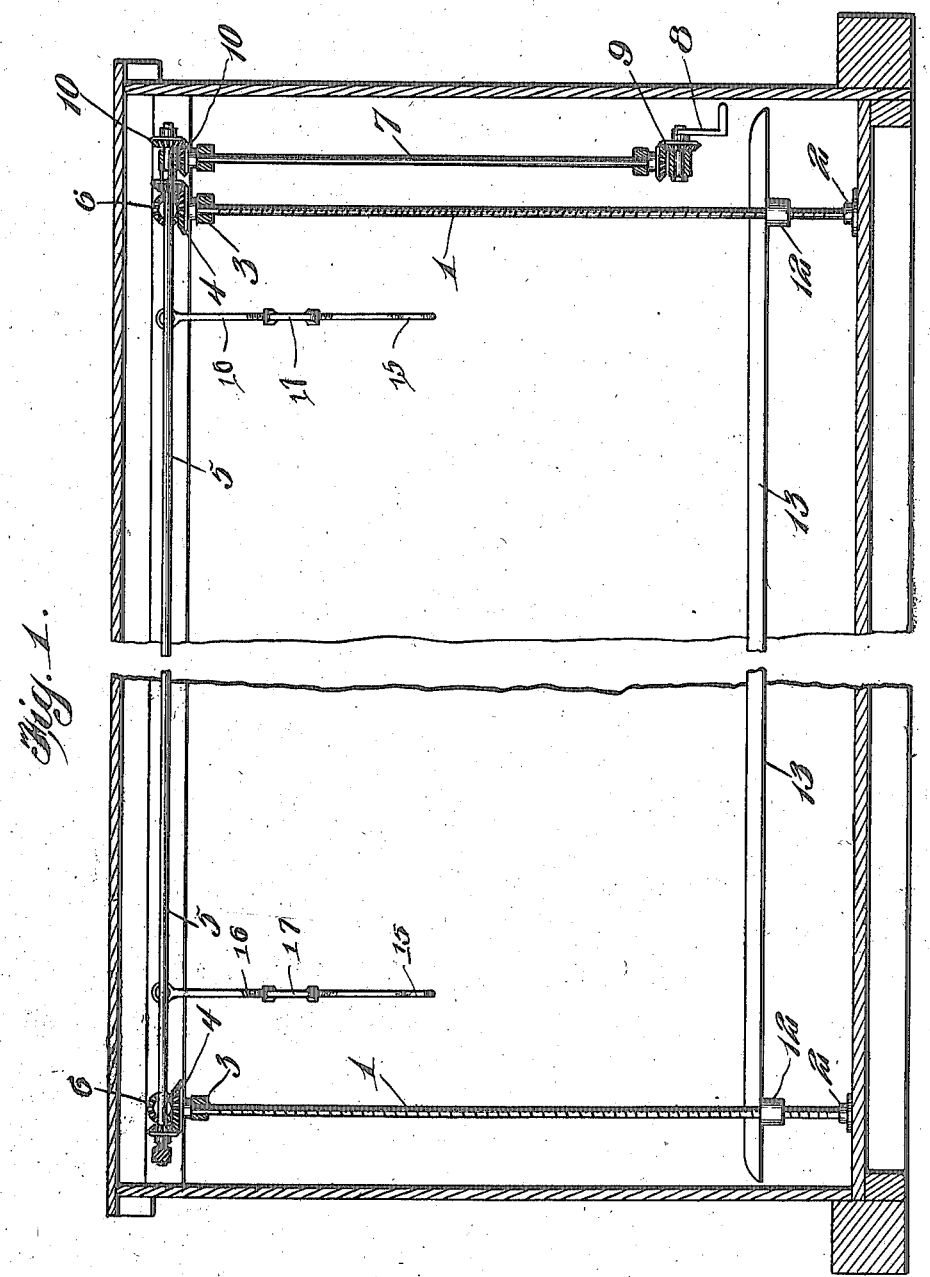

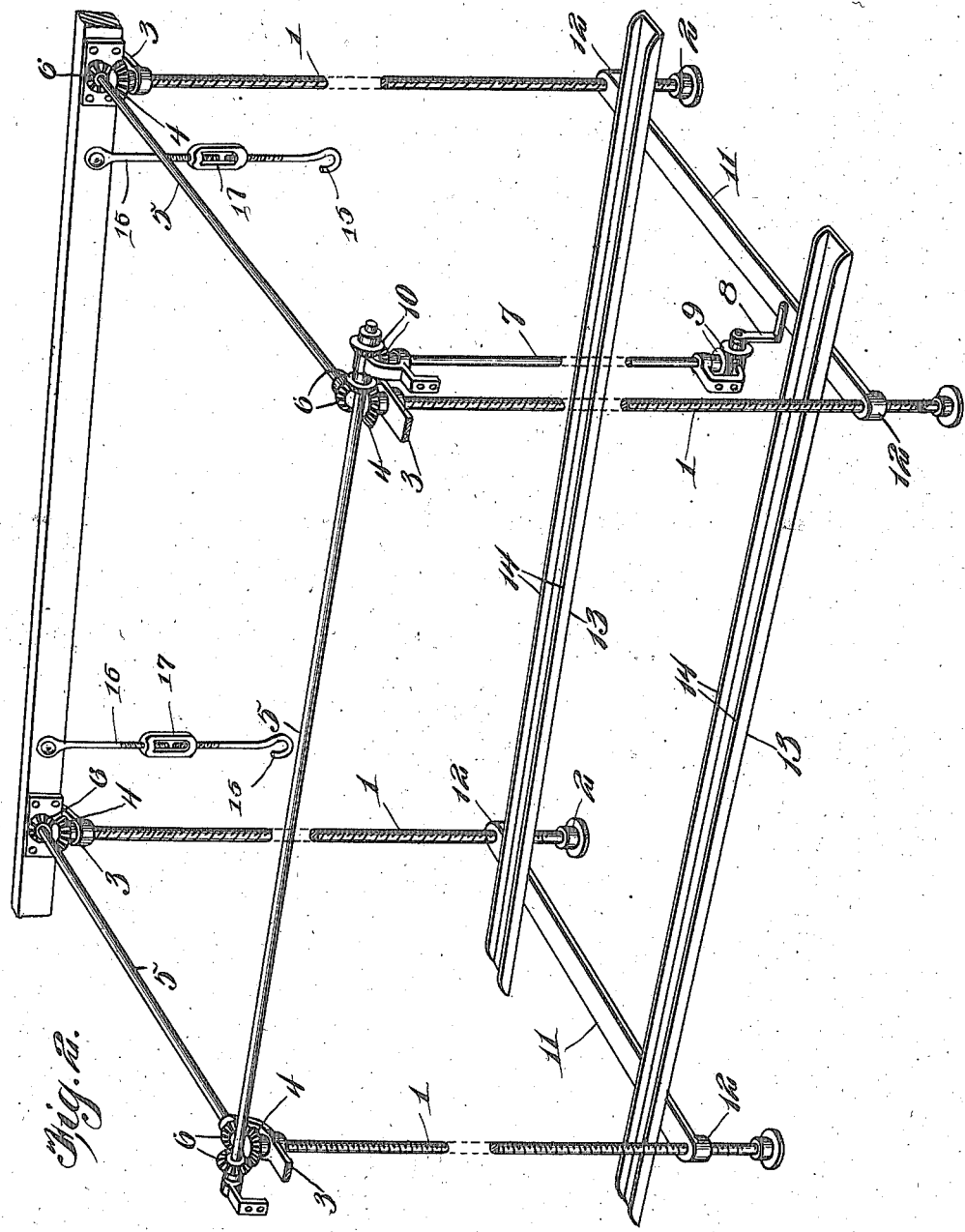

JOHN McFADDEN, OF YORK, NEBRASKA.

CAR.

1,181,909.        Specification of Letters Patent.        Patented May 2, 1916.

Application filed December 18, 1915. Serial No. 67,649.

*To all whom it may concern:*

Be it known that I, JOHN MCFADDEN, a citizen of the United States, residing at York, in the county of York and State of Nebraska, have invented new and useful Improvements in Cars, of which the following is a specification.

The invention relates to an improved structure designed for use in cars for the transportation of automobiles or the like, the improved structure providing a means whereby the carrying capacity of the car may be doubled in that it will adapt the car for use as double deck cars, each adapted to carry a number of automobiles.

The main object of the present invention is the provision of a mechanism including a vehicle supporting track adapted to be mounted within the car with the track coöperating with the remaining parts, so that it may be elevated to any desired extent.

The invention in the preferred form of details will be described in the following specification, reference being had particularly to the accompanying drawings, in which:—

Figure 1 is a view in elevation illustrating the use of the device in a car, the side of the car being removed. Fig. 2 is a perspective view showing the device removed from the car.

The improvement comprises threaded uprights 1 preferably four in number, arranged at the respective sides and ends of the car immediately adjacent the corners, the lower ends of the rod being mounted in suitable bearing brackets 2 and the upper ends of the brackets 3 secured to appropriate parts of the car framing. The upper ends of the rods 1 are provided with beveled gears 4, and rotatably supporting in bearings mounted on the car body are rods 5 which connect the adjacent rods 1, the rods 5 being formed with beveled gears 6 coöperating with the respective gears 4 so that movement of any one rod 5 will transmit similar and simultaneous movement to all of the remaining rods through said rods to the upright rods 1. An operating rod 7 is mounted in an appropriate part of the car frame structure being driven by a crank 8 and intermediate the gearing 9 at its lower end, the upper end being operatively connected with one of the rods 5 through intermediate gearing 10.

Frame bars 11 are provided with terminal sleeve sections 12 threaded for coöperation with the respective rods 1, the frame bars extending transverse the end pair of rods 1 and being operatively connected to such end pair as described. Track members 13 of channel form having side ledges 14 are connected in spaced parallel relation to the respective frame bars 11, the tracks being of such width and so spaced apart as to readily permit the coöperation of the wheels of the automobile or similar vehicle therewith.

If desired, a plurality of sections, such as described, may be connected together for simultaneous operation, and when elevated to a proper height braces may be provided by which the automobile tracks may be supported from the roof of the car. For example, such braces may include hooks 15 connected with rods 16 by turn buckles 17 having threaded connection with hook shanks and with the rod, the rod being connected to the car structure by an appropriate point and supporting the device by engaging beneath the track members 13 when the latter have been elevated, one hook engaging on one side and the other on the opposite side to prevent lateral swaying.

The operation of the improved device will be apparent from the above description, taken in connection with the accompanying drawings, it being understood that if desired, chain and sprocket wheels may be mounted for simultaneously operating the screw rods 1 in place of the rods and beveled gears shown.

What is claimed is:—

The combination with a freight car or the like, of an automobile support including screw rods fixed within the car against other than rotative movement, rods supported in brackets secured to the car and bridging the upper ends of the screw rods, gearing connections intermediate the terminals of said rods and the screw rods, an operating shaft supported within the car in parallelism to one of the screw rods, gearing connections between said operating shaft and one of the first mentioned rods, means for driving the operating shaft, frame bars joining each transverse pair of screw rods and having threaded connection therewith, and channeled track members mounted upon the respective frame bars, extending in spaced parallel relation and between the screw rods.

In testimony whereof I affix my signature in presence of two witnesses.

JOHN McFADDEN.

Witnesses:
J. Cox,
R. S. Camadden.